United States Patent Office 3,190,114
Patented June 22, 1965

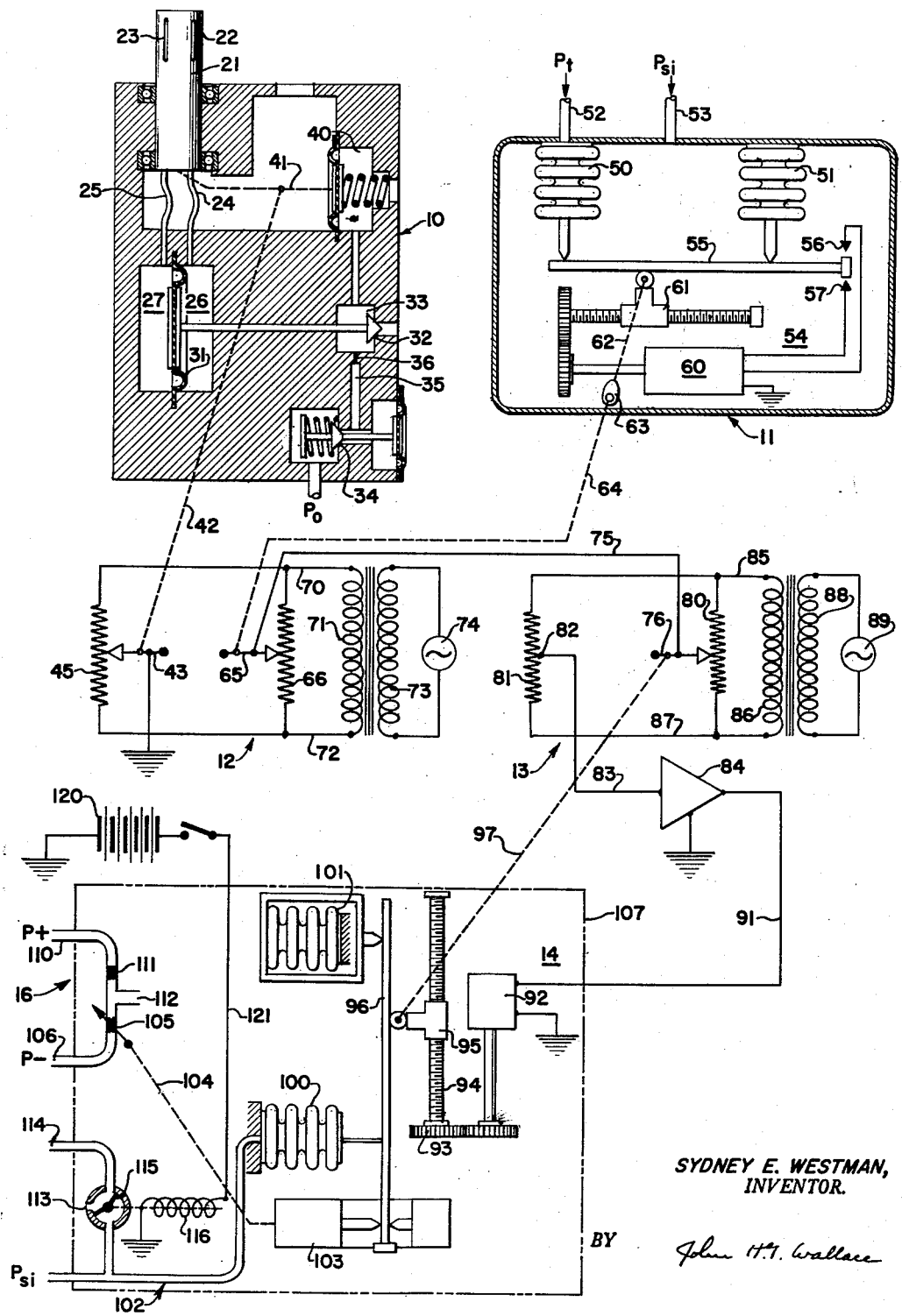

3,190,114
STATIC PRESSURE COMPENSATING SYSTEM
Sydney E. Westman, Inglewood, Calif., assignor to The Garrett Corporation, Los Angeles, Calif., a corporation of California
Continuation of application Ser. No. 655,601, Apr. 29, 1957. This application Nov. 8, 1961, Ser. No. 152,710
16 Claims. (73—180)

This application is a continuation of my previous application Serial No. 655,601, filed April 29, 1957 and now abandoned.

The invention pertains to compensating systems and more particularly to a system designed to compensate the indicated static pressure of an aircraft in flight to give true static pressure.

A true static pressure is required in modern aircraft, regardless of the attitude of the aircraft or the ambient conditions, for operating a large number of aircraft instruments and systems. The usual way of obtaining a static pressure is by a static pressure tap which is subject to several sources of error such as turbulence, shock wave, and the angle of attack of the static tap with respect to the airstream. Turbulence and shock wave errors are direct functions of the Mach number which permits corrections to be determined as a function of the Mach number. The angle of attack depends upon various factors such as weight of the aircraft, the vertical acceleration of the aircraft, the wing area and various functions of the Mach number. It has been determined that the true angle of attack can be determined by measuring an apparent angle of attack and correcting it by adding various functions of the Mach number. From the above it can easily be seen that the indicated static pressure can be corrected by sensing the apparent angle of attack, and applying suitable corrections in the form of various functions of the Mach number to correct the angle of attack and to correct for turbulence and shock wave.

The indicated angle of attack can be determined by use of an instrument having a sensing probe which intercepts the airstream and gives an indicated angle of attack. Such an instrument is disclosed in a co-pending application entitled "Airstream Direction Indicator" by Sydney E. Westman, Serial No. 418,397, filed March 24, 1954, now Patent No. 2,834,208, granted May 13, 1958. The Mach number can be determined by using a pressure ratio transducer which gives an output proportional to the ratio of the indicated static pressure to the total pressure. The various functions of the Mach number which are required can be determined from a flight test of the aircraft and then supplied by various computing devices in the transducer. Such an instrument is disclosed in the co-pending application entitled "Pressure Ratio Measuring Instrument" by Sydney E. Westman, Serial No. 403,135, filed January 11, 1954, Patent No. 2,923,153.

This invention compensates an indicated static pressure by utilizing an airstream directional instrument which gives an electrical signal which varies as the apparent angle of attack of the aircraft. This signal is combined with a second electrical signal which varies as various functions of the Mach number to form one bridge circuit. The signal or unbalance of this bridge circuit is supplied to a second bridge circuit whose signal or unbalance is applied to a suitable amplifier. The amplifier, in turn, controls the position of the movable fulcrum of a normally balanced beam. Movement of the fulcrum repositions the second bridge so that its signal or unbalance is equal and opposite to the signal of the first bridge. Two bellows are attached to opposite ends of the beam with one of the bellows being connected to a source of indicated static pressure and the other bellows being evacuated. The unbalance of the beam caused by movement of the fulcrum is sensed by a pneumatic amplifier which amplifies the unbalance and uses the amplified signal to control a variable orifice in a conduit which is connected to a source of pressurized fluid. A second conduit which has a fixed orifice is connected in series with the first orifice and supplies a pressurized fluid having a different pressure from the first source of pressurized fluid. Thus, by controlling the mixing of the two sources of pressurized fluid, a final pressure which is substantially equal to true static pressure may be obtained. The final pressure is referred to as the compensated static pressure. The true static pressure then return the beam to a balanced condition.

Accordingly, it is the principal object of this invention to provide an instrument for compensating the indicated static pressure to give true static pressure utilizing a command signal which controls the position of a movable fulcrum of a normally balanced beam, with the unbalance of the beam being used to control a source of pressurized fluid to give a pressure substantially equal to the true static pressure. The true static pressure is then used to restore the beam to a balanced condition.

Another object of this invention is to provide an instrument for compensating the indicated static pressure to provide true static pressure which utilizes a pneumatic means to sense the unbalance of a normally balanced beam, with the pneumatic means being used to control a variable orifice to control a source of pressurized fluid to give a pressure substantially equal to the true static pressure.

Another object of this invention is to provide an instrument which will compensate the indicated static pressure to give true static pressure in response to a command or error signal which is dependent upon the parameters of the indicated angle of attack and various functions of the Mach number. The command signal is determined by the extent of indicated static pressure error and is sometimes referred to as the static pressure error signal. The command or error signal, in turn, is used to control the position of a movable fulcrum of a normally balanced beam to which two bellows are attached, one of which is connected to a source of indicated static pressure, the other of which is evacuated. The unbalance of the beam, which is sensed by the pneumatic means, is used to control the source of pressurized fluid to give a pressure substantially equal to true static pressure. The true static pressure, in addition, is used to return the beam to its normally balanced position.

These and other objects of the invention will be more clearly understood by those skilled in the art to which it pertains from the following detailed description of the preferred embodiment when taken in conjunction with the attached drawing showing a schematic arrangement of a preferred embodiment.

In the attached drawing, 10 represents an airstream direction instrument which controls the position of the wiper arm 43 to give an electrical signal which varies as the apparent angle of attack of the aircraft. The airstream direction measuring instrument 10 has a rotatable probe 21 which is provided with two angularly spaced slots 22 and 23 which are directed so as to intercept the airstream. The slots 22 and 23 sense two pressures which are exactly equal when the aerodynamic center plane of the probe is directly in line with the airstream and which will differ as the center plane of the probe is changed in relation to the airstream. The two pressures sensed by the slots 22 and 23 are supplied to two chambers 26 and 27 of a pneumatic amplifier by means of conduits 24 and 25, respectively. The two chambers 26 and 27 are formed in a space in the top of the probe housing by means of a flexible diaphragm 31, the outer edges of which are retained by any desired means (not shown). The diaphragm 31 is connected to a bleed valve 32 which modulates the pressure in a conduit 33. The bleed valve 32 is supplied with a source of regulated pressure $P_o$ from any source by means of a pressure regulating valve 34. The regulated pressure $P_o$ is supplied to the bleed valve through a fixed orfice 36 so that only a metered amount is supplied to the bleed valve 32. The pressure in conduit 33, which is modulated by the bleed valve 32, is supplied to a pneumatic actuator 40 which is connected to the probe 21 by means of a suitable linkage 41. Thus, the pneumatic actuator 40 will return the probe to a position where two pressures sensed by the slots 22 and 23 are exactly balanced. In this condition, the center plane of the probe will be in line with the airstream and the angle between the aircraft and the center plane of the probe will be the indicated angle of attack.

The pneumatic actuator 40 is also connected to the wiper arm 43 by means of a suitable linkage 42. The wiper arm 43 travels over a suitable potentiometer 45 so as to vary the potential appearing across the potentiometer in proportion to the indicated angle of attack. The potentiometer 45 is connected in parallel with a second potentiometer 66 whose associated wiper arm 65 is controlled by a pressure ratio transducer 11. The pressure ratio transducer 11 is provided with two bellows 50 and 51 which are connected to opposite ends of a normally balanced beam 55. The bellows 51 is evacuated while the bellows 50 is supplied with the total pressure $P_t$ by a conduit 52. The case, which is sealed, is supplied with indicated static pressure by a conduit 53. The total pressure and the indicated static pressure may be taken from the impact and static openings, respectively, of a Pitot-static tube disposed in the relative airstream. Thus the bellows 50 senses total pressure inside and indicated static pressure outside while the bellows 51 senses only indicated static pressure. The beam 55 is balanced about a movable fulcrum 61 which is moved along the beam so as to balance the indicated static pressure ($P_{si}$) sensed by bellows 51 against the difference ($Q_{ci}$) between total pressure and indicated static pressure sensed by the bellows 50. The balancing of the beam is controlled by means of two switches 56 and 57, which are positioned on opposite sides of the end of the beam adjacent bellows 51 and sense any unbalance of the beam. The switches energize a suitable motor 60 which drives a gear train to drive a lead screw moves the fulcrum 61 along the beam. The fulcrum 61 is connected to a cam 63 by means of a suitable linkage 62 and the cam 63 in turn moves the wiper arm 65 by means of the linkage 64. The pressure ratio measuring instrument 11 will thus measure the ratio between the pressures $Q_{ci}$ and $P_{si}$ which ratio is equal to a function of the Mach number. Thus, by providing any desired shape for the cam 63 in the pressure ratio transducer 11 which positions the wiper arm 65, the output of the potentiometer 66 can be made equal to the Mach number or a function of the Mach number.

One end of each of the potentiometers 45 and 66, which cooperatively form a first bridge circuit 12, is connected to a lead 70 which is connected to one end of a secondary winding 71 of a power transformer. The other end of each of the potentiometers is connected to a lead 72 which is connected to the other end of the secondary winding 71. The primary winding 73 of the power transformer is connected to a suitable alternating current supply 74. The wiper arm 65 of potentiometer 66 is connected to the wiper arm 76 of a third potentiometer 80 by means of a lead 75. The potentiometer 80 in combination with the fixed resistance 81 forms a second bridge circuit 13. The center tap 82 of the fixed resistance 81 is connected to an amplifier 84 by means of a lead 83. One end of the potentiometer 80 and one end of the fixed resistance 81 are connected to a lead 85 which is connected to one end of a secondary winding 86 of a second power transformer. The other end of the potentiometer 80 and the other end of the fixed resistance 81 are connected to a lead 87 which is connected to the other end of the secondary winding 86. The primary winding 88 of the second power transformer is connected to a suitable power supply 89.

The above circuit thus provides a means whereby an electrical signal which is representative of the indicated angle of attack parameter of the airplane can be combined with an electrical signal which is representative of the function of the Mach number parameter. The two electrical signals representing these quantities are combined in the first bridge circuit described above. Unbalance of the first bridge circuit generates a command or error signal which is coupled through a circuit including the lead 75 to the second bridge circuit. If a change in the signal or unbalance of the first bridge circuit is received by the second bridge circuit, it will become unbalanced and send a signal to the amplifier 84. This signal will appear between the lead 83 and the ground connection of the amplifier 84. The amplifier will then energize the motor 92 to reposition the fulcrum 95 of a normally balanced beam 96 as will be described below. The movement of the fulcrum 95 will reposition the wiper arm 76 by means of linkage 97 so as to generate an unbalanced condition in the second bridge circuit which is exactly equal to and opposed to the unbalanced condition of the first bridge circuit. Thus, the two bridge circuits will be in a substantially balanced or null position and no effective current or signal will flow in lead 75.

The amplifier 84 is preferably of a proportional type which will give an output signal, the pulse length of which varies in proportion to the magnitude of the command or error signal appearing in the first bridge circuit 12. The output signal of the amplifier 84 is connected to a motor 92, which is used to move the fulcrum 95 by a lead 91. It is desirable to use this type of amplifier since it will supply substantially full rated power to the motor 92. Thus, the motor 92 will function at substantially full rated power and stability of the servo system will be obtained by the combination of varying the pulse length of the output signal of the amplifier 81 and using a motor which has an internal brake.

The motor 92 drives a suitable gear train 93 which is connected to a lead screw 94 which in turn positions the fulcrum 95 of the normally balanced beam 96. As was explained above, the movement of the fulcrum 95 is used to control the position of the wiper arm 76 by means of suitable linkage 97. A bellows 100 is attached to one end of the beam 96 by emans of a flexure strap or other means capable of transmitting the force of bellows 100 in two directions. A second evacuated bellows 101 is attached to the opposite end of the beam 96 by a U-shaped member so that it applies its effective force to the same side of the beam as the force applied by the bellows 100. The bellows 100 is connected to the source of indicated static pressure $P_{si}$ by means of a conduit 102. The evacuated bellows 101 should be spaced from its end of the beam 96 so that the movable fulcrum 95 may travel beyond the point of attachment of the bellows 101 to provide for correction when indicated static pressure $P_{si}$ is less than the true static pressure. The forces generated by the bellows 100 and 101 are then coupled through the beam 96, and any unbalance of the beam will create a resultant force which is sensed by a suitable pneumatic amplifier 103 connected by any desired means (not shown) to a suitable source of pressurized fluid such as $P_o$. The pneumatic amplifier 103 may be of the type shown in the co-pending application of Dain B. Lones and Sydney E. Westman entitled "Altitude Controller," Serial No. 619,888, filed November 1, 1956, now Patent No. 2,833,899, granted May 6, 1958. While a pneumatic amplifier 103 is used for sensing the unbalance of the beam, other types of position sensing devices, such as E-core devices, may be used. The output of the pneumatic amplifier 103 is connected to a variable orifice 105 by means of a linkage 104. The variable orifice 105 is mounted in a conduit 106, which is connected to a sink for a relatively lower pressurized fluid P—. Connected in series with the orifice 105 is a fixed orifice 111 which is mounted in a conduit 110 which is connected to a source of relatively higher pressurized fluid P+. The common portion of the conduits 106 and 110 between the orifices 105 and 111 is connected to the interior of a sealed enclosure 107 by means of an open-end conduit 112. The sealed enclosure 107 encloses the normally balanced beam 96 and the drive motor 92 and bellows 100 and 101. Thus, by controlling the variable orifice 105, the pressure existing in the interior of the enclosure 107 may be maintained at substantially any value between the pressure P— and the pressure P+. The pressure ($P_s$) which exists in the enclosure 107 is substantially equal to true static pressure and can be supplied to any desired load by means of an open-end conduit 113 which connects with a conduit 114.

The bellows 101 will then sense pressure $P_s$ and bellows 100 will sense a pressure $P_{si}-P_s$. Thus, the ratio of $P_s$ to $P_{si}$ will only depend on the fulcrum position and after the fulcrum position is set the pneumatic amplifier 103 will change the pressure $P_s$ to return the beam to a balanced condition. The fulcrum position of course is determined by the signal from the second bridge circuit 13 which includes a combination of the indicated angle of attack and function of the Mach number.

As explained in my above-noted Patent No. 2,923,153, beam 96 operates with fulcrum 95 to transmit forces from bellows 100 and 101 to the lower end of the beam which controls the compensated static pressure in enclosure 107. The displacement of the fulcrum from the point at which bellows 100 is attached to the beam varies the moment exerted by the indicated static pressure, and thus transmits this force with variable mechanical advantage.

Forces dependent on the compensated static pressure are applied to the beam by both bellows, which together exert an opposing, clockwise, torque which, in general, depends on fulcrum position and is transmitted with variable mechanical advantage to balance a counter-clockwise acting torque component exerted by indicated static pressure applied to bellows 100. Where the effective areas of bellows 100 and 101 are equal, however, the torque resulting from the external static indicated pressure is dependent only on this pressure and is independent of fulcrum position.

The open-end conduit 113 is connected to a three-way valve 115 whose position is controlled by a solenoid 116, which is connected to any desired D.C. power source such as a battery 120 by means of a lead 121. The three-way valve 115 is normally positioned so as to connect the open-end conduit 113 with the conduit 114 which, in turn, supplies pressure $P_s$ to any desired location. In case of failure in any part of the compensating system, the three-way valve may be moved to a position so that the conduit 114 is connected to the conduit 102 which is connected to a source of indicated static pressure $P_{si}$. Thus, in case of failure of the compensating system the indicated static pressure $P_{si}$ will still be available for use by the aircraft instruments and other equipment. In addition, the valve 115 can be made to fail in a safe position by connecting the solenoid to the power supply of the aircraft so that in case of failure of the power supply the conduit 114 will be connected directly to the source of indicated static pressure.

Before the above described compensating system is operated, the airplane to which it is applied must be flight-tested and suitable corrections determined for the various functions of the Mach number and angle of attack. After these corrections have been determined, cams may be provided for the airstream measuring instrument 10 and the pressure ratio measuring instrument 11 to feed the required corrections to the first bridge circuit 12. The use of cams in these instruments is more fully explained in the above referenced co-pending applications of Sydney E. Westman. After the airplane has been calibrated, the bridge circuit 12 will control the second bridge circuit 13 which, in turn, controls the motor 92 by means of the amplifier 84. The motor in turn will reposition fulcrum 95 which will control the opening of the orifice 105 to regulate the fluid pressure $P_s$ within enclosure 107 to return the beam 96 to a balanced position. The movement of the fulcrum 95 will position the wiper arm 76, thus feeding a signal back to the second bridge circuit 13 to return the two bridge circuits to a balanced or null position. When the bridge circuits are returned to a null position, the motor 92 will stop and the orifice 105 will maintain a fixed setting.

While but one preferred embodiment of this invention has been described in detail, many modifications and changes, within the spirit and scope of the invention, will occur to those skilled in the art.

I claim:

1. An indicated static pressure compensating system to supply a compensated static pressure for aircraft comprising: means operative in dependency on at least Mach number and apparent angle of attack of an aircraft in flight to generate an error signal, an enclosure, enclosure pressure control means, means for supplying indicated static pressure, pressure responsive means within the enclosure for generating separate forces varying in dependency on said indicated static pressure and on pressure within the enclosure, means operable to couple the forces generated by the pressure responsive means and transmit an actuating resultant force to the pressure control means, and control means operative to vary the coupled relationship of at least one of said forces responsively to changes in the error signal and thereby to develop a compensated static pressure in the enclosure.

2. An indicated static pressure compensating system to supply a compensated static pressure for aircraft comprising: means operative in dependency on at least Mach number and apparent angle of attack of an aircraft in flight to generate an error signal, an enclosure, enclosure pressure control means, means for supplying indicated static pressure, pressure responsive means within the enclosure for generating separate forces varying in dependency on said indicated static pressure and on pressure within the enclosure, means operable to couple the forces generated by the pressure responsive means and transmit an actuating resultant force to the pressure control means, and control means operative to vary the coupled relationship of said forces responsively to changes in the error signal and thereby to develop a compensated static pressure in the enclosure.

3. An indicated static pressure compensating system to supply a compensated static pressure for aircraft comprising: means operative in dependency on at least Mach number and apparent angle of attack of an aircraft in flight to generate an error signal, an enclosure, enclosure pressure control means, means for supplying indicated static pressure, pressure responsive means within the enclosure for generating separate forces varying in dependency on said indicated static pressure and on pressure within the enclosure, means operable to couple the forces generated by the pressure responsive means and transmit an actuating resultant force to the pressure control means, and control means for the operative to vary the coupled relationship of the force component dependent on indicated static pressure responsively to changes in the error signal and thereby to develop a compensated static pressure in the enclosure.

4. An indicated static pressure compensating system for supplying compensated static pressure for aircraft comprising: means operative in dependency on at least Mach number and apparent angle of attack of an aircraft in flight to generate an error signal, means for supplying indicated static pressure, means for supplying a compensated static pressure, a movable beam having a balanced position, means responsive to changes in said indicated and said compensated static pressures for moving said beam from its balanced position, a fulcrum movable longitudinally of said beam in dependency on the value of said error signal, and compensated static pressure control means responsive to movement of said beam from its balanced position for varying said compensated static pressure to return the beam to its balanced position.

5. An indicated static pressure compensating system for supplying compensated static pressure for aircraft comprising: means operative in dependency on at least mach number and apparent angle of attack of an aircraft in flight to generate an error signal, means for supplying indicated static pressure, means for supplying a compensated static pressure, a movable beam having a balanced position, means responsive to changes in said indicated and said compensated static pressures for moving said beam from its balanced position, a fulcrum movable longitudinally of said beam, means responsive to movement of said fulcrum to generate a nulling signal, means for moving said fulcrum operative in dependency on the value of said error signal and the value of the nulling signal, and compensated static pressure control means responsive to movement of said beam from its balanced position for varying said compensated static pressure to return the beam to its balanced position.

6. An indicated static pressure compensating system for supplying compensated static pressure for aircraft comprising, means responsive to indicated angle of attack and a function of Mach number of flight of said aircraft for generating an error signal, means for supplying indicated static pressure, means for supplying a compensated static pressure, a movable beam having a balanced position, means responsive to changes in said indicated and said compensated static pressures for moving said beam from its balanced position, a fulcrum movable longitudinally of said beam in dependency on the value of said error signal, and compensated static pressure control means responsive to movement of said beam from its balanced position for varying said compensated static pressure to return the beam to its balanced position.

7. An indicated static pressure compensating system for supplying compensated static pressure for aircraft comprising: means responsive to indicated angle of attack and a function of Mach number of flight of said aircraft for generating an error signal, means for supplying indicated static pressure, means for supplying a compensated static pressure, a movable beam having a balanced position, means responsive to changes in said indicated and said compensated static pressures for moving said beam from its balanced position, a fulcrum movable longitudinally of said beam, means responsive to movement of said fulcrum to generate a nulling signal, means for moving said fulcrum operative in dependency on the value of said error signal and the value of the nulling signal, and compensated static pressure control means responsive to movement of said beam from its balanced position for varying said compensated static pressure to return the beam to its balanced position.

8. An indicated static pressure compensating system for supplying compensated static pressure for aircraft comprising: means operative in dependency on at least Mach number and apparent angle of attack of an aircraft in flight to generate an error signal, an enclosure, a movable beam within said enclosure having a balanced position, a fulcrum movable longitudinally of the beam in dependency on the value of said error signal, means for supplying indicated static pressure, a first pressure responsive element internally fed from said last mentioned means acting on said beam on one side of said fulcrum, a second evacuated pressure responsive element acting on said beam at a point spaced from the first element, said pressure responsive elements being exposed at their exteriors to the pressure within said enclosure, and enclosure pressure control means responsive to movement of said beam from its balanced position for regulating the pressure within the enclosure to a compensated static pressure value and operative thereby to return the beam to its balanced position.

9. An indicated static pressure compensating system for supplying compensated static pressure for aircraft comprising: means operative in dependency on at least Mach number and apparent angle of attack of an aircraft in flight to generate an error signal, an enclosure, a movable beam within said enclosure having a balanced position, a fulcrum movable longitudinally of the beam, means responsive to movement of said fulcrum from a beam balanced position to generate a nulling signal, means for supplying indicated static pressure, a first pressure responsive element internally fed from said last mentioned means and acting on said beam on one side of said fulcrum, a second evacuated pressure responsive element acting on said beam at a point spaced from the first element, said pressure responsive elements being exposed at their exteriors to the pressure within said enclosure, means for moving said fulcrum operative in dependency on the value of said error signal and the value of the nulling signal, and enclosure pressure control means responsive to movement of said beam from its balanced position for regulating the pressure within the enclosure to a compensated static pressure value and operative thereby to return the beam to its balanced position.

10. An indicated static pressure compensating system for supplying compensated static pressure for aircraft comprising: means operative in dependency on at least Mach number and apparent angle of attack of an aircraft in flight to generate an error signal, an enclosure, a movable beam within said enclosure having a balanced position, a fulcrum movable longitudinally of the beam, means responsive to movement of said fulcrum from a beam balanced position to generate a nulling signal, means for supplying indicated static pressure, a first pressure responsive element internally fed from said last mentioned means and acting on said beam on one side of said fulcrum, a second evacuated pressure responsive element acting on said beam at a point spaced from the first element, said pressure responsive elements being exposed at their exteriors to the pressure within said enclosure, means for moving said fulcrum operative in dependency on the value of said error signal and the value of the nulling signal, means for regulating the pressure within the enclosure including a variable flow restricting orifice, and means responsive to movement of said beam from its balanced position for varying said orifice to regulate the pressure within the enclosure to a compensated static pressure and operative thereby to return the beam to its balanced position.

11. An indicated static pressure compensating system for supplying compensated static pressure for aircraft comprising: means operative in dependency on at least Mach number and apparent angle of attack of an aircraft in flight to generate an error signal, an enclosure, a movable beam within said enclosure having a balanced position, a fulcrum movable longitudinally of the beam, means responsive to movement of said fulcrum from a beam balanced position to generate a nulling signal, means for supplying indicated static pressure, a first pressure responsive element internally fed from said last mentioned means and acting on said beam on one side of said fulcrum, a second evacuated pressure responsive element acting on said beam at a point spaced from the first element, said pressure responsive elements being exposed at their exteriors to the pressure within said enclosure, means feeding a pressurized fluid to said enclosure through a fixed flow restricting orifice, means bleeding fluid from said enclosure through a variable flow restricting orifice, and means responsive to movement of said beam from its balanced position for varying said latter orifice to regulate the pressure within the enclosure to a compensated static pressure and operative thereby to return the beam to its balanced position.

12. An indicated static pressure compensating system for supplying compensated static pressure for aircraft comprising, means sensing the apparent angle of attack of said aircraft, means sensing a function of Mach number of flight of said aircraft, means responsive to the aforesaid means to supply an error signal dependent upon said apparent angle of attack and said function of Mach number, a movable beam having a balanced position, a fulcrum movable longitudinally of the beam, a source of regulatable pressurized fluid, means for supplying indicated static pressure, means for applying a force varying in dependency on said regulated pressurized fluid pressure to said beam, means for applying a force varying in dependency on said indicated static pressure to said beam, source control means responsive to beam movement from its balanced position to regulate said pressized fluid to return the beam to its balanced position, and means responsive to said error signal to move said fulcrum to maintain the regulated fluid pressure at a compensated static pressure value.

13. An indicated static pressure compensating system for supplying compensated static pressure for aircraft comprising, means sensing the apparent angle of attack of said aircraft, means sensing a function of Mach number of flight of said aircraft, means responsive to the aforesaid means to supply an error signal dependent upon said apparent angle of attack and said function of Mach number, a movable beam having a balanced position, a fulcrum movable longitudinally of the beam, means responsive to movement of said fulcrum from a beam balanced position to generate a nulling signal, a source of regulatable pressurized fluid, means for supplying indicated static pressure, means for applying a force varying in dependency on said regulated pressurized fluid pressure to said beam, means for applying a force varying in dependency on said indicated static pressure to said beam, source control means responsive to beam movement from its balanced position to regulate said pressurized fluid to return the beam to its balanced position, and means responsive to the value of said error signal and to the value of said nulling signal to move said fulcrum to maintain the regulated fluid pressure at a compensated static pressure value.

14. An indicated static pressure compensating system for supplying compensated static pressure for aircraft comprising, means sensing the apparent angle of attack of said aircraft, means sensing a function of Mach number of flight of said aircraft, means responsive to the aforesaid means to supply an error signal dependent upon said apparent angle of attack and said function of Mach number, an enclosure, means controlling the pressure within said enclosure, a movable beam within said enclosure having a balanced position, a fulcrum movable longitudinally of the beam, means responsive to movement of said fulcrum from a beam balanced position to generate a nulling signal, means for supplying indicated static pressure, a first pressure responsive element internally fed from said last mentioned means and acting on said beam at one side of said fulcrum, a second evacuated pressure responsive element acting on said beam at a point spaced from the first element, said pressure responsive elements being exposed at their exteriors to the pressure within said enclosure, means responsive to movement of the beam from its balanced position for operating the pressure controlling means to return the beam to its balanced position, and means responsive to the value of said error signal and to the value of said nulling signal to move said fulcrum to maintain the controlled pressure at a compensated static pressure value.

15. An indicated static air pressure compensating system to supply a compensated static pressure for aircraft, comprising: means providing air at compensated static pressure to the static system of said aircraft, said means including a conduit, means providing a plurality of secondary sources of air, one of said sources being at a pressure higher and another at a pressure lower than that of said static system, fluid conduit means connecting said conduit and said plurality of secondary sources; means for generating an error signal including a first air pressure ratio responsive instrument having static and impact connections with the ambient air surrounding said aircraft for sensing the ratio of the excess of the impact pressure over the indicated static pressure, to the indicated static pressure, a second air pressure ratio responsive instrument controlled in response to said error signal and having a connection with air at said indicated static air pressure and with air at said compensated static pressure for providing a second signal in accordance with the sensed ratio of the difference between the indicated static pressure and the compensated static pressure, to the compensated static pressure, and means operative in dependency on the second signal to vary the flow of air between said conduit and at least one of said secondary sources to regulate said compensated static air pressure in said conduit.

16. An indicated static air pressure compensating system to supply air at compensated static pressure for aircraft, comprising: means providing air at compensated static pressure to the static system of said aircraft, said means including a conduit, means providing a secondary source of air at a pressure higher than that of said static system, said source means including a fixed flow restricting orifice, means providing a sink at a pressure lower than that of said static system, said sink means including a variable flow restricting orifice, fluid conduit means connecting said conduit with said secondary air source and said sink through said orifices; means for generating an error signal including a first air pressure ratio responsive instrument having static and impact connections with the ambient air surrounding said aircraft for sensing the ratio of the excess of the impact pressure over the indicated static pressure, to the indicated static pressure, a second air pressure ratio responsive instrument controlled in response to said error signal and having a connection with air at said indicated static air pressure and with air at said compensated static pressure for providing a second signal in accordance with the sensed ratio of the difference between the indicated static pressure and the compensated static pressure, to the compensated static pressure, and operating means for said variable orifice of said sink means responsive to the second signal for varying the flow of air from said conduit to said sink means to regulate said conpensated static air pressure in said conduit.

References Cited by the Examiner

UNITED STATES PATENTS

| 1,319,241 | 10/19 | Nassen | 73—182 |
|---|---|---|---|
| 2,538,824 | 1/51 | Andresen. | |
| 2,542,717 | 2/51 | Smith | 73—182 |
| 2,551,470 | 5/51 | Smith | 73—147 |
| 2,599,288 | 6/52 | Schaeffner | 73—182 |
| 2,641,105 | 6/53 | Drake. | |
| 2,725,746 | 12/55 | Young | 73—180 |
| 2,800,136 | 7/57 | Bowditch | 73—182 X |
| 2,814,198 | 11/57 | Howland | 73—147 |
| 2,833,899 | 5/58 | Lones et al. | 73—182 X |
| 2,834,208 | 5/58 | Westman | 73—180 |
| 2,923,153 | 2/60 | Westman | 73—182 |
| 3,002,382 | 10/61 | Gardner | 73—182 |
| 3,029,636 | 4/62 | Mullins | 73—178 |

FOREIGN PATENTS 772,588   4/57   Great Britain.

ISAAC LISANN, *Primary Examiner.*

LOUIS R. PRINCE, LEO SMILOW, *Examiners.*